March 11, 1924.
C. A. MATSON
LACE TIPPING MACHINE
Filed Oct. 6, 1922      7 Sheets-Sheet 1
1,486,838
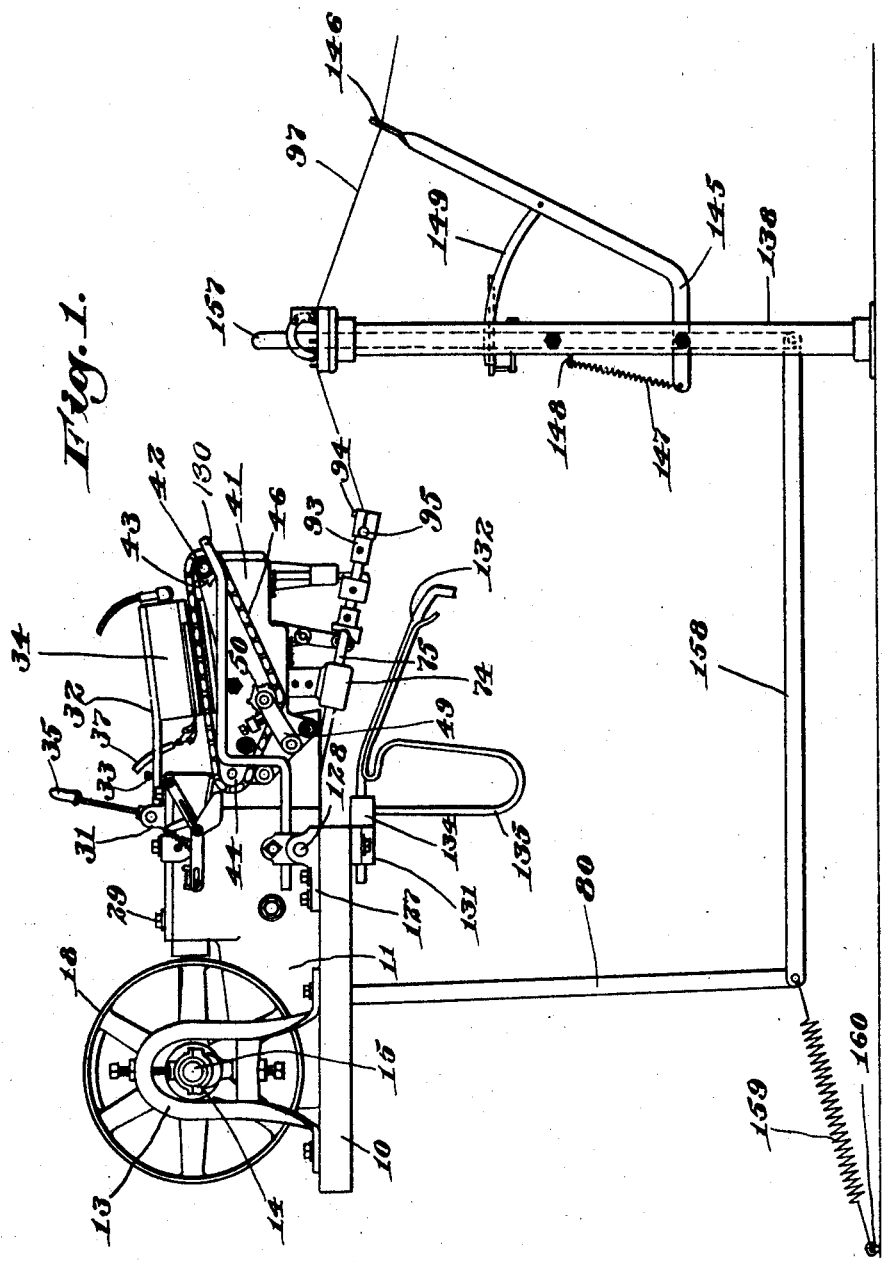
Inventor
Carl A. Matson
by James R. Hodder
attorney

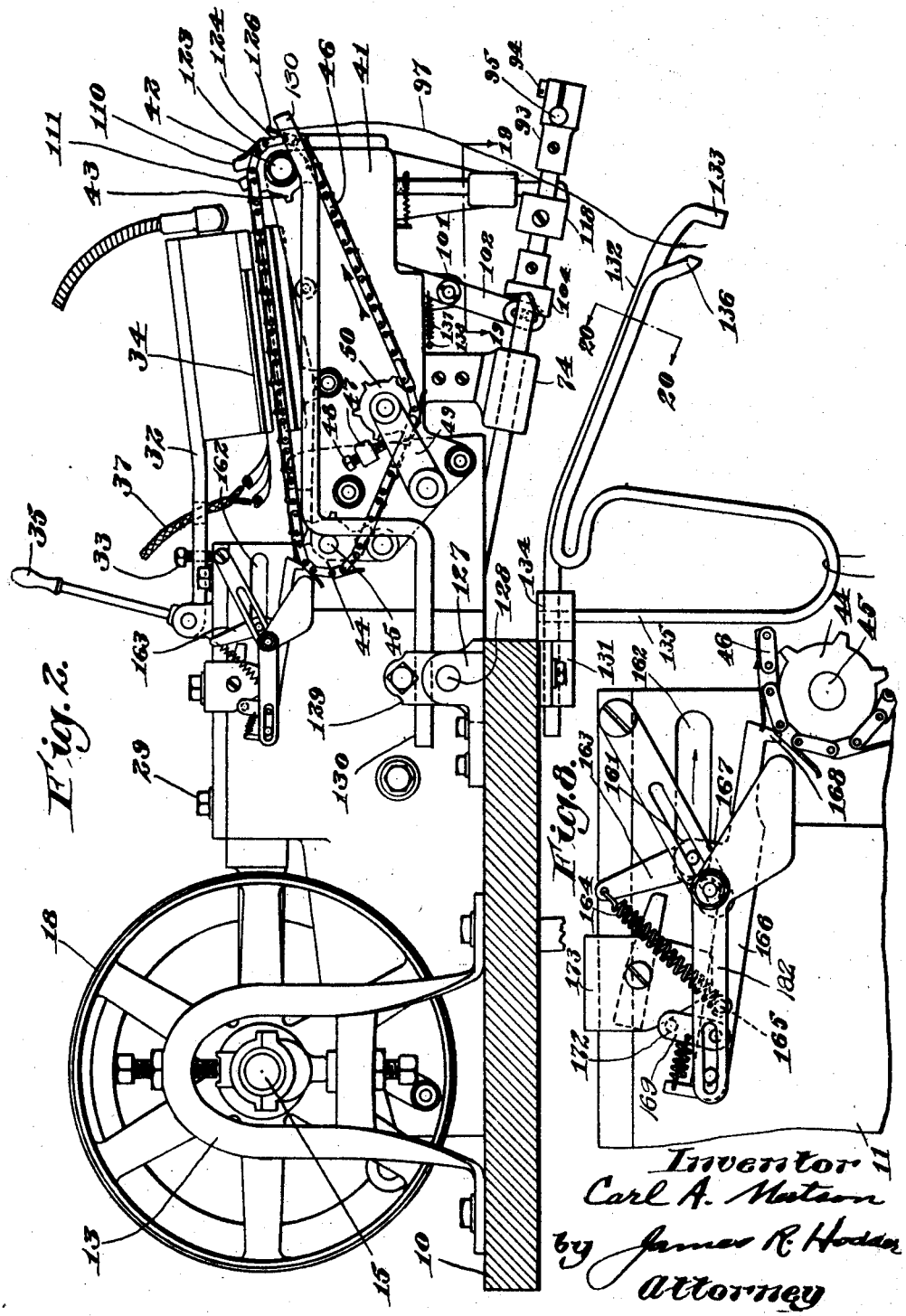

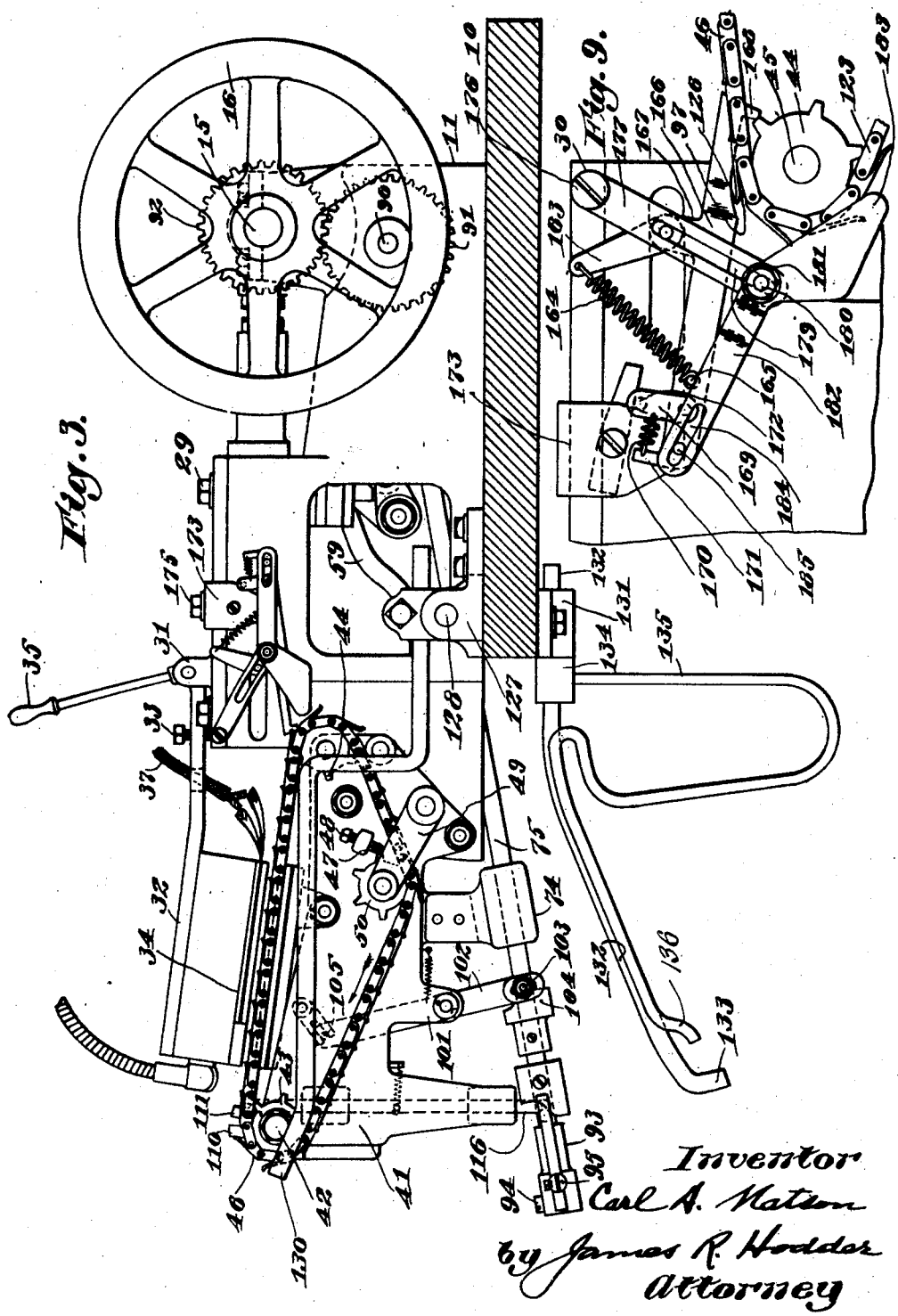

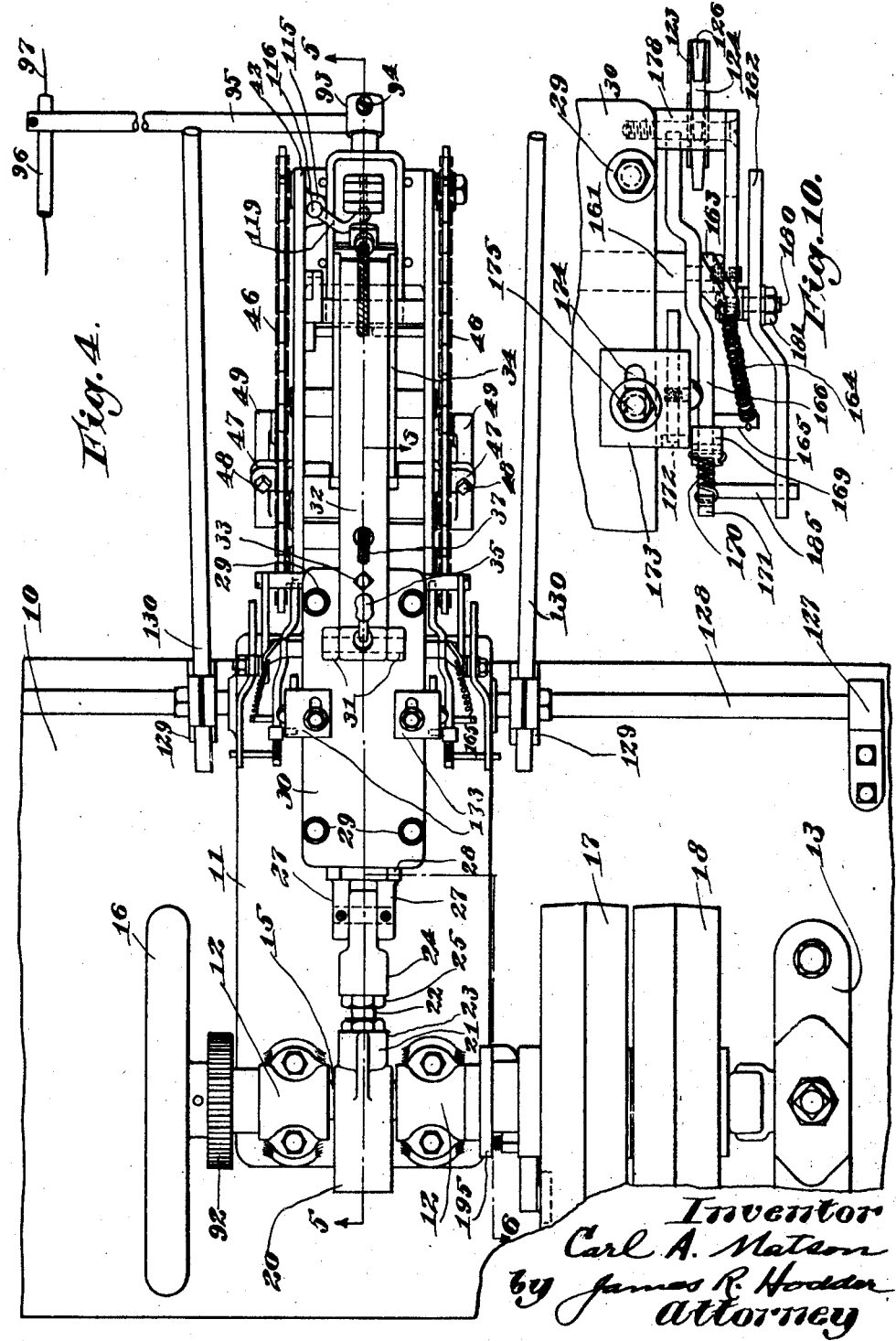

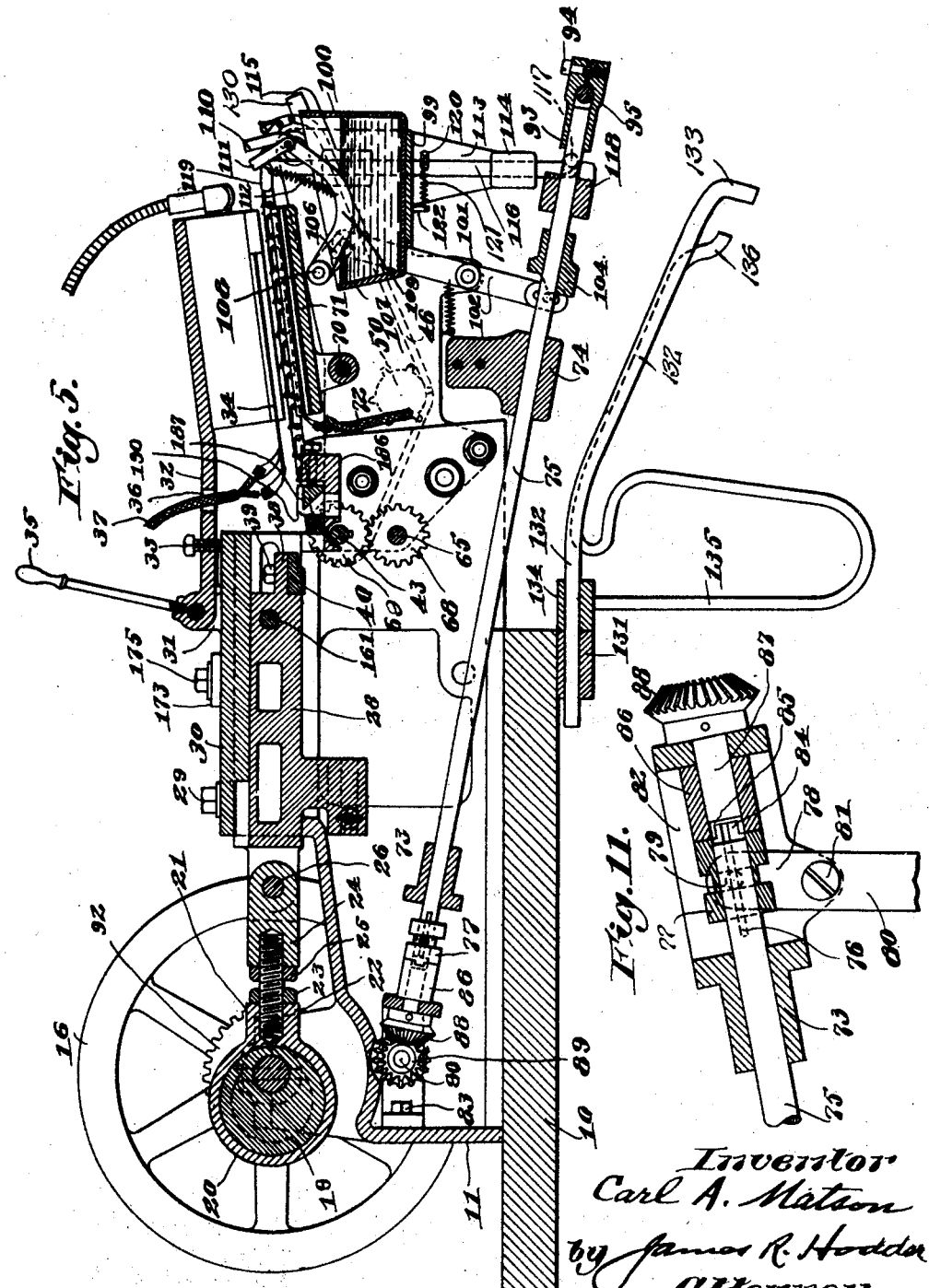

March 11, 1924. 1,486,838
C. A. MATSON
LACE TIPPING MACHINE
Filed Oct. 6, 1922   7 Sheets-Sheet 6
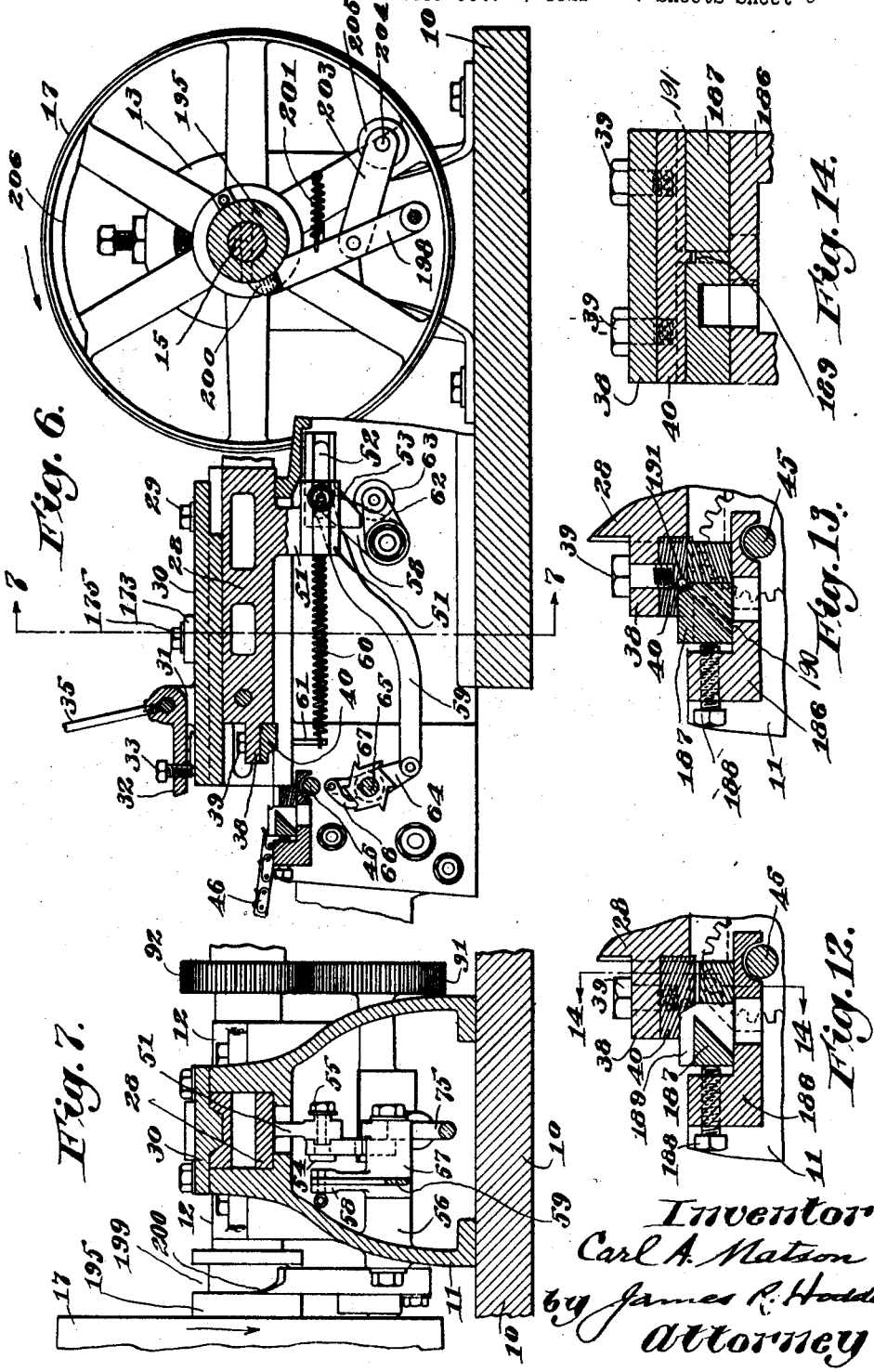

March 11, 1924.
C. A. MATSON
LACE TIPPING MACHINE
Filed Oct. 6, 1922   7 Sheets-Sheet 7
1,486,838
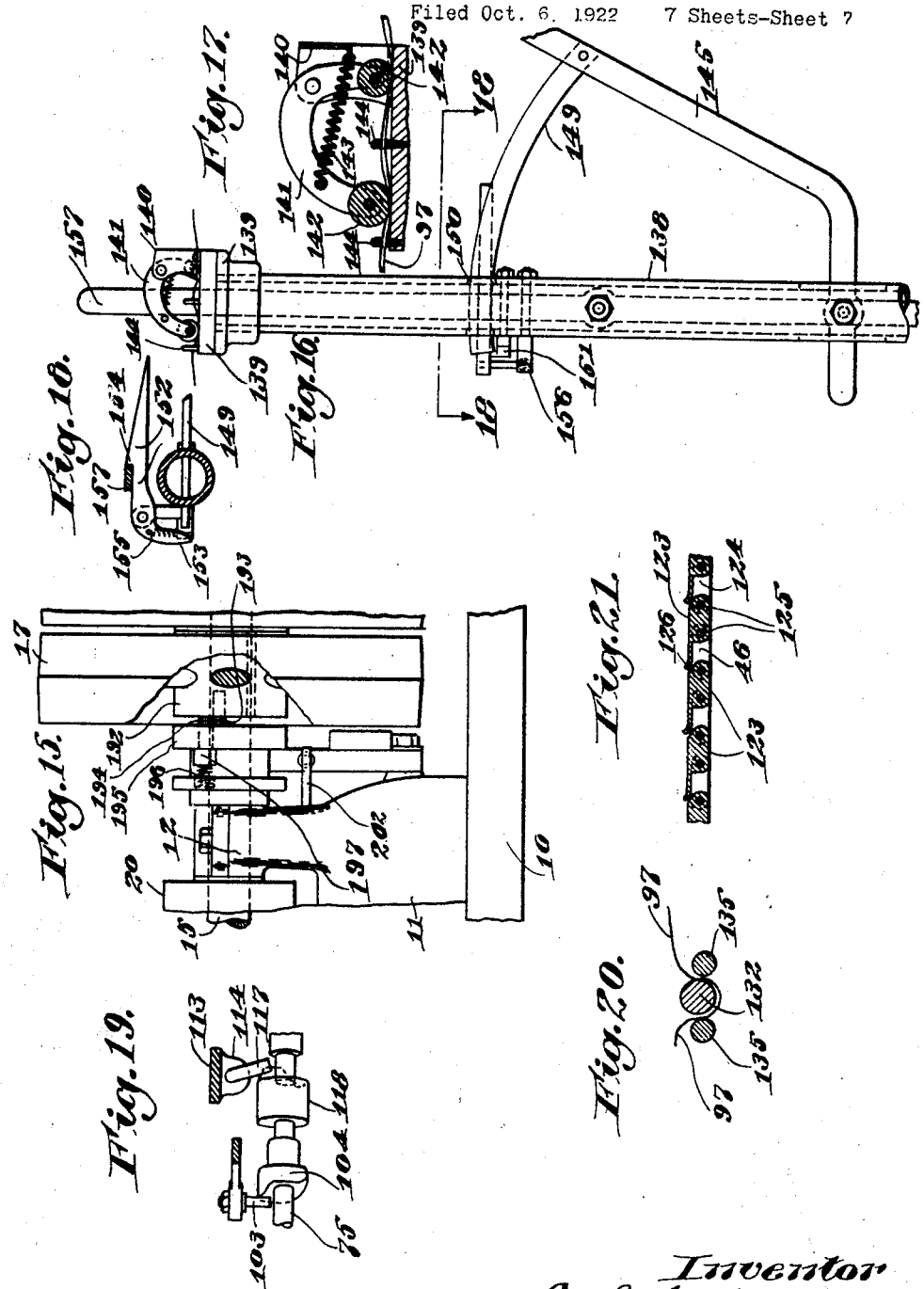
Inventor
Carl A. Matson
by James R. Hodder
Attorney Patented Mar. 11, 1924.

1,486,838

UNITED STATES PATENT OFFICE.

CARL A. MATSON, OF LYNN, MASSACHUSETTS, ASSIGNOR TO MATSON LACE TIPPING MACHINE COMPANY, OF BOSTON, MASSACHUSETTS, A CORPORATION OF MASSACHUSETTS.

LACE-TIPPING MACHINE.

Application filed October 6, 1922. Serial No. 592,814.

*To all whom it may concern:*

Be it known that I, CARL A. MATSON, a citizen of the United States, and resident of Lynn, in the county of Essex and State of Massachusetts, have invented an Improvement in Lace-Tipping Machines, of which the following description, in connection with the accompanying drawings, is a specification, like letters on the drawings representing like parts.

My present invention relates to lace tipping machines, and more particularly to an automatically operating lace tipping machine for applying a moldable or composition material to form a "fabric tip."

Heretofore in the lace tipping art where moldable material was utilized for the forming of the so-called "fabric" tips, it has been extremely difficult to handle either the moldable material—without gumming, sticking, and injuring the machine, and also such a degree of heat was required that the lace was apt to be injured. Furthermore, in prior lace tipping of this class, the dies were usually heated to such an extent that the molding operation required a long length of time to "set"; hence it was a very slow process. Moldable material must be sufficiently cool or dry to maintain its molded form.

My present invention is intended to obviate these prior difficulties; to provide sufficient heat to properly mold the material; to maintain the dies sufficiently cool to quickly set the tip of the lace; to permit great speed of operation, and to perform the feeding, measuring, lace cutting, material heating and supplying, as well as the forming and completing of the lace as a continuous operation and with capacity for great speed.

In my development in this art, I have devised a lacing which may be tipped with a molded or moldable material of novel ingredients, as well as of celluloid, rubber compounds, or the like, and the present machine is to apply such material to the laces without damage or injury to the fabric of the lacing, and using a predetermined amount of material for each tipping operation. Such tips of a molded or moldable material are, as applied by my machine, semi-flexible and therefore able to withstand wear and abuse without injury. As laces are of various forms, round, flat, etc., it has heretofore been extremely difficult to so devise a lace tipping machine for tipping laces that will work equally well on flat or round material and it has been customary in the majority of cases, where it is desired to tip flat lacings, to put such lacings through a preliminary operation for the purpose of rounding the ends of such lacings prior to the putting on of the lacing tip. With the machine of my present invention, either type of lacing, round or flat, may be tipped with equal facility as the sequence of operations is such that the lacing tip is first impregnated with a predetermined amount of moldable material, the tip being kept heated for a predetermined length of time after impregnation, and finally the impregnated end of the lacing is molded, and set, the flat lacing, if such be the one worked upon, being made substantially circular in cross section and, with my improved machine, it is possible to mold the moldable material over an extreme end of the tip thus enclosing the lacing end with a moldable tip.

The principal object of my present invention is an improved lace tipping machine for tipping the ends of lacings, such as shoe lacings, with a tip of molded or moldable material.

Another object of my invention is an improved machine of this type wherein a predetermined amount of moldable material is placed on a lacing end and heat applied to thoroughly impregnate the lacing end with such moldable material.

A further object of my invention is an improved machine of this type for molding and setting the tip of moldable material to enclose the end of the lacing.

Other objects and novel features of the construction and arrangement of parts comprising my invention will be apparent as the description of the invention progresses.

In the accompanying drawings,

Fig. 1 is an end elevation;

Fig. 2 is an enlarged side elevation, certain parts being shown in section, of my machine taken from the same side as Fig. 1;

Fig. 3 is a view similar to Fig. 2 but from the opposite side of the machine;

Fig. 4 is a plan view of that much of the machine shown in either Fig. 2 or 3;

Fig. 5 is a vertical longitudinal section on the line 5—5 of Fig. 4;

Fig. 6 is a vertical longitudinal section on the line 6—6 of Fig. 4;

Fig. 7 is a vertical end section on the line 7—7 of Fig. 6;

Fig. 8 is an enlarged view, in elevation, of a portion of the mechanism illustrated in Fig. 2, with such mechanism shown in one of its positions;

Fig. 9 is an enlarged elevation similar to Fig. 8, but with the parts illustrated shown in another position;

Fig. 10 is a plan view of the mechanism shown in Fig. 8;

Fig. 11 is an enlarged sectional view of the clutch mechanism illustrated in Fig. 5;

Fig. 12 is an enlarged sectional view of a portion of the mechanism shown in Fig. 6, the mechanism of the present figure, however, being in a different position from that shown in such Fig. 6;

Fig. 13 is a view similar to Fig. 12, but with the elements in still another position;

Fig. 14 is a vertical sectional view on the line 14—14 of Fig. 12;

Fig. 15 is a partial rear view of the machine, showing the position of the one revolution clutch mechanism;

Fig. 16 is an enlarged elevation of the lacing guiding means shown in Fig. 1;

Fig. 17 is a vertical sectional view of the tip mechanism illustrated in Fig. 16;

Fig. 18 is a sectional view on the line 18—18 of Fig. 16;

Fig. 19 is a sectional view on the line 19—19 of Fig. 2;

Fig. 20 is a sectional view on the line 20—20 of Fig. 2, and

Fig. 21 is a sectional elevation of a portion of the lacing feed chain.

Referring to the drawings, 10 designates a base suitable for mounting on a bench or pedestal, as may be desired, and secured to such base, in any suitable manner, is a hollow frame 11 having formed integrally therewith, and at one end thereof, bearings 12. Secured to the base 10 at one side of the end thereof, is a bearing standard 13 provided with an adjustable bearing 14 in alinement with the bearings 12, and in the bearings 12 and 14 is rotatably mounted a shaft 15 having secured at the end remote from the bearing 13 a hand or fly wheel 16, while mounted on the shaft 15, between one of the bearings 12 and the bearing 14 are tight and loose pulleys 17 and 18 respectively. Secured to the shaft 15 and between the bearings 12 is an eccentric 19 about which is fitted an eccentric strap 20. This eccentric strap 20 is provided with a boss 21 drilled and tapped to receive one end of a connecting stud 22, a lock nut 23 being utilized to hold the stud 22 in adjusted position with relation to the boss 21. The other end of this stud 22 fits into a threaded hole in one end of a connecting member 24, a lock nut 25 being utilized to hold the connecting member 24 in adjusted position with relation to the stud 22 and therefore the eccentric strap 20. The other end of the connecting member 24 is pivotally connected by a shaft 26 to a pair of lugs or ears 27 formed integral with a sliding member or cross head 28 that is slidably mounted in the hollow frame 11, bolts 29 cooperating with a cover plate 30 to adjust the cross head 28 in such frame 11. Formed integral with, and on the top of the cover 30, are lugs or ears 31 in which are pivotally mounted a plate 32, a bolt 33 for adjusting the position in the machine of an electric heating unit 34 secured to the end of the side of the plate 32. This plate 32, adjacent the pivotal connection thereof, is provided with an operating handle 35 for the purpose of raising the end of the plate 32, and therefore the heating unit 34, for the purpose of inspection or replacement, as may be desired. This plate 32 is perforated at 36 to provide a lead-in hole for electric conductors 37 leading from a suitable source of current to the heating unit 34. Formed on the end of the cross head 28 at the end remote from the connecting member 24 is an extension 38, to the under side of which is secured by bolts 39 a cutter and former 40 for a purpose to be hereinafter described.

Secured to each side of the frame member 11, and extending in alinement therewith, at the end of the frame remote from the shaft 15, are bearing plates 41. At the ends of the plates 41 are bearings in which are rotatably mounted a shaft 42 carrying at its ends and outside of the plates 41, a sprocket wheel 43 in alinement with sprocket wheels 44 secured to a shaft 45 that is rotatably mounted forwardly to the shaft 42, but in the frame member 11. Over these sprocket wheels 43 and 44 run feed chains 46, the particular construction and function of which will be hereinafter described. Formed integral with each side plate 41, and on the outside thereof, is a lug 47 through which is threaded a bolt 48, the end of which engages a pivoted lever 49, pivotally mounted on the plate 41 and having rotatably mounted at its free end a sprocket wheel 50 that meshes with each feed chain 46, as clearly shown in Fig. 2, the lever 49 and sprocket wheel 50 and adjusting bolt 48 acting to regulate the tension of the feed chain 46.

Formed integral with, and extending downward from the lower surface of the cross head 28 is a member 51 provided with a guideway and an elongated slot 52, and mounted in the slot 52 and adjustable along the length of the slideway, is a cam member 53 secured in adjusted position in such guideway and slot 52 by a bolt and nut 54 and 55 respectively. Formed integral with, and on the interior of the frame member 11, is a bearing boss 56 in which is secured a shaft and on such shaft is rotatably mounted a member 57 having formed integral with, and extending radially therefrom a member 58 in which is pivotally mounted one end of a curved connecting rod 59, the pivot pin of this connecting rod 59 having attached thereto one end of a coil spring 60, the other end of this coil spring being attached to a depending pin 61 secured to the frame member 11. Also formed on the member 57, and extending radially outward therefrom, and at an angle to the member 58, is a member 62 to which is rotatably mounted at its outer, or free end, a roller 63 lying in the path of, and adapted to be engaged by, the cam member 53 secured on the depending member 51. The other end of the curved connecting rod 59 is pivotally attached to one end of a rocker arm 64 rotatably mounted intermediate its ends on a shaft 65 rotatably mounted in bearings in the frame member 11. The end of the rocker arm 64 remote from the pivotal connection therewith of the curved connecting rod 59 has pivotally mounted therein a pawl 66 that meshes with, and is adapted to drive, a ratchet wheel 67 that is keyed to the shaft 65. Secured to the shaft 65 is a gear 68 which meshes with, and drives, a similar gear 69 secured to the shaft 43. From the above, it is evident that rotation of the shaft 15 by means of a belt or other mechanism passing over the tight and loose pulleys 17 and 18 will cause a reciprocation of the cross head 28 and a reciprocating motion of the curved connecting rod 59 by means of the cam 53 engaging with the roller 63 on each reciprocation of the cross head 28 and that such motion of the curved connecting rod 59 will cause the pawl 66 to engage and rotate the ratchet 67 step by step and therefore impart intermittent or step by step movement to the feed chains 46. Mounted in the plates 41 on the shaft 70 is a heating element 71 that is located beneath the upper reach of the feed chains 46, feed wires 72 leading from a source of power furnishing the heating power for such element 71, the material, therefore, carried by the feed chains 46 passes between the heating elements, or units, 34 and 71, and the degree of heat given off by such units may be regulated in any usual or desired manner.

Within the hollow frame member 11, and formed integral therewith, is a bearing 73, and attached to the side plates 41 and depending downwardly therefrom, is a bearing 74, while rotatably mounted in such bearings 73 and 74 is a shaft 75 that lies at an angle to the horizontal, as clearly shown in Fig. 5. The end of this shaft 75 within the frame member 11 is provided with a slot 76, and encircling this end of the shaft is one element 77 of a clutch, this element being provided with a circumferential groove 78 in which works a pin 79 attached to the upper end of an operating lever 80 that is pivotally mounted at 81 to a member 82 that is secured to a wall of the frame member 11 by bolts 83. This element 77 is provided with a key (not shown) that engages with the slot 76 thus allowing longitudinal movement of the element 77 with respect to the shaft 75 while forcing such element to rotate with the shaft. The extreme end of the member 77 is provided with a tongue 84 that engages with the groove 85 in a collar 86 secured to a stub shaft 87 that is rotatably mounted in a portion of the member 82, this shaft 87 having secured thereto a bevel gear 88 that meshes with, and is driven by, a bevel gear 89 secured to a shaft 90 rotatably mounted in bearings in the frame member 11. The shaft 90 extends outwardly beyond the limits of the frame member 11 and has secured to its outer end a gear 91 that meshes with, and is driven by, a gear 92 secured to the main drive shaft 15. When the clutch elements 77 and 86 are brought into engagement with each other, as shown in Fig. 11, rotation of the main drive shaft 15 will cause a rotation of the shaft 75. Secured to the end of the shaft 75 remote from the clutch element 77 is a clamp 93 provided with a clamping bolt 94, this clamp being utilized to clamp in position a rod or tube 95 that extends laterally from, and at right angles to, the shaft 75, as clearly shown in Fig. 5. The free end of this rod, or tube, 95 carries a short section of tube 96 and through which passes the endless lacing 97 from which the lacings, such as shoe lacings, are cut.

Extending between the side plates 41 is a shelf 99 on which rests, or is secured, if desired, a tank 100 which is to be filled, or kept filled, with liquid molded or moldable material, as clearly shown in Fig. 5. On one of the side plates 41 is a depending arm 101 on which is pivotally mounted, intermediate its ends, a lever 102, the lower end of this lever 102 being provided with a laterally extending pin 103 that extends into the path of, and is engaged by, a cam 104 secured to the shaft 75 and this shaft will cause an oscillating or rocking movement of the lever 102 about its pivotal point. Secured to the lever 102 at a point above the pivotal connection thereof on the arm 101 is one end of a coil spring 137, the other end of this spring being connected at a point 138 to the side plate 41. The upper end of the lever 102 is provided with a laterally extending pin 105 that engages in a slot 106 in a lever arm 107 attached to a shaft 108 rotatably mounted in bearings in the side plates 41. Secured to the shaft 108, and in such position as to dip into the tank 100, is a curved arm, or lever, 109, the outer or free end of this arm being bent, as shown at 110, and adjacent this portion 110 is pivotally mounted a jaw 111 near the upper end of which is secured one end of a spring 112, the other end of this spring being attached to the arm 109 at a point intermediate its ends, as clearly shown in Fig. 5. The rocking movement of the lever 102 will, through the lever 107, impart a rocking movement to the arm 109 to feed a predetermined portion of liquid molded or moldable material from the tank 100 upward. Formed integral with, and depending downwardly from one of the side plates 41, is a member 113 provided at its lower end with a bearing member 114 and near its top end with a bearing member 115, these bearing members being in alinement with each other and having rotatably mounted therein a shaft 116, the lower end of which is bent outwardly, as shown at 117, and is adapted to be engaged by a cam 118 secured to the shaft 75, while at the top end is secured a laterally extending curved arm 119 the end of which engages the pivotal jaw 111, the throw of the cam 118 being timed, and of such dimensions as to move the pivotal jaw 111 over into practical engagement with the end 110 of the lever 109 when such lever or arm 109 is in its uppermost position. Secured to the shaft 116 at a point intermediate its ends and below the shelf 99 is a radially extending arm or pin 120 to the outer end of which is secured one end of a coil spring 121, the other end of this spring being secured to a depending pin 122 secured to the end face of the shelf 99, the function of this spring being to insure the return of the shaft 106 to its initial position after having been moved to its maximum travel therefrom by the cam 118.

Referring to Fig. 21, it will be noted that the feed chain 46 is comprised of a plurality of blocks 123 and a plurality of links 124, the blocks 123 being flexibly joined to the links 124 by pins 125. Each of the blocks 123 is provided with an extension 126 formed integral with, and at one end of the block 123, this extension 126 being of such length as to extend from the forward end of one block 123 to slightly in advance of the rear end of the preceding block 123, as shown in Fig. 21. As the feed chain 46 moves over the sprocket wheels 43, 44, and 50, in the direction of the arrow shown, for example, in Fig. 2, and particularly as such feed chain passes over the sprocket 43, the extension 126 moves outwardly from its position adjacent the rear end of the block 123 so as to form a substantially V shaped opening between itself and its associated links 124 and into which opening the lacing 97 from which the shorter lacings to be tipped are manufactured, as will be hereinafter described, is fed.

On the end of the platform 10 on each side of, and adjacent the frame member 11 remote from the main drive shaft 15 are pillow blocks 127 in which is rotatably mounted a shaft 128, and to this shaft at each side of the frame member 11 is adjustably mounted carriers 129, these carriers being adjusted longitudinally of the shaft 128 and each provided with a split end in which is adjustably mounted a curved bearing or rod 130, these bearings 130 extending upward and outward from the frame member 11 to a point beneath and adjacent the shaft 42, as clearly shown in Figs. 2 and 3. Secured to the base of the platform 10 to the end face thereof beneath the shaft 128 and practically in alinement with the shaft 75 is a member 131 in which is adjustably mounted a curved bearing 132 that extends outwardly and downwardly to a point substantially under the outer end of the bearings 130, the extreme outer end of this bearing 132 being provided with a substantially hook-like member 133. Mounted on the bearing, adjacent the member 131, is a block 134 having secured therein on either side of the bearing 132 a rod 135, this rod extending downwardly, then upwardly, then outwardly substantially parallel to the bearing 132 and then downwardly at 136, this portion 135 defining with the substantially hook-like member 133 an opening into which the lacing 97 is fed by the arm 95. The position of the rods 135 with respect to the bearing 132 is clearly shown in Fig. 20, and the position the lacing 97 occupies with respect to such bearings is also indicated in such figure. As the main drive shaft 15 rotates, it imparts an intermittent step by step movement to the feed chains 46 in the direction of the arrow shown in the drawings, which, as they pass upwardly over the sprockets 43, defining a substantially V shaped opening between the successive members 126 of the blocks 123 and the links 124. Simultaneous with this intermittent step by step movement of the feed chains 46, there is a continuous rotation of the shaft 75 carrying the right angularly extending arm 95 that in turn carries the short length of tube 96 and through which passes the lacing 97. Previous to the operation of the device, the lacing 97 is led through the tube 96 and attached to any convenient portion of the apparatus as, for example, the bearing 132 adjacent the block 134. The speed of rotation of the shaft 75 is so timed with respect to the intermittent step by step movement of the feed chains 46 that a loop of the lacing 97 is fed under the hook-like end 133 of the bearing 132 over the bearing 130 into the V shaped passage between the projection 126 and the link 124 of the feed chains over the other bearing 130 and downward again under the hook-like end 133, the shaft 75 completing one revolution and laying one coil of lacing 97 for each step by step movement of the feed chains.

Located on the floor of the room or building in which the apparatus above described is located, and at a sufficient distance from the end of the rotating shaft 75 is a hollow standard 138 and secured to the top of this standard is a member 139 which has secured to its surface at one side thereof a bearing member 140 in which is pivotally mounted a U shaped member 141 having rotatably mounted at the ends thereof rollers 142 which engage with the top surface of the member 139, a coil spring 143 being secured one end to the substantially U shaped member 141 and the other end to the bearing member 140. Secured to the top of the member 139 are a plurality of eyes 144 and through which is reeved a lacing 97, this lacing passing through the eyes 144 and under rollers 142, as clearly shown in Figs. 16 and 17. This construction constitutes a tension device for the lacing 97. Pivotally mounted on the standard 138 at a point intermediate its ends is a lever 145, the upper free end of which is provided with a hole or eye 146 while the other end has attached thereto one end of a coil spring 147, the other end of this coil spring being attached to a pin 148 secured to the standard 138, as clearly shown in Fig. 1, this spring 147 tending to hold the free end of the lever 145 in its most outward position with respect to the standard 138. The lacing 97 ordinarily is brought to the machine on a reel (not shown) and the lacing is led through the hole or eye 146, under the rollers 142, through the eyes 144, and then through the short length of tube 96 attached to the end of the arm 95, as above described. Pivotally secured to the lever 145 at a point between the free end of such lever and its pivotal connection to the standard 138 is an arcuate member 149, the free end of this member passing through a slot 150 in the standard 138 and extends to a point beyond such standard, as clearly shown in Figs. 16 and 18. Secured to the standard 138 adjacent to, but beneath the member 149, is a bearing member 151 to which is pivotally attached a latch member 152, this latch member being provided with an arm 153 that lies in the path of movement of the arcuate member 149 and with a bevelled hook end 154. Secured to the member 152 is one end of a coil spring 155, the other end of this coil spring being attached to an arm 156 secured to the standard 138. Pivotally mounted on, and intermediate the ends of, the standard 138 is an operating lever 157. To the lower end of this lever is pivotally attached one end of a connecting link 158, the other end of this connecting link 158 being in turn connected with the lower end of the lever 80, which is shown in enlarged view in Fig. 11, this lever directly operating clutch members 77 and 86 to connect the shaft 75 with the driving pinions 88 and 89, as above described. When the clutch members 77 and 86 are in engagement with each other, the operating lever 157 is in the position shown in Figs. 16 and 18; that is, such lever is engaged by the bevelled hook portion 154 of the latch member 152. The hole or eye 146 in the free end of the arm 145 is of such diameter as to allow the lacing 97 to pass freely therethrough. If, however, there is present in the lacing a defect such, for example, as a knot, that would prevent the lacing from feeding freely through such hole 146, then when the surplus that has passed through such hole 146 has been fed onto the feed chains 46 by the rotating arm 95, the tension exerted on the free end of the arm 145 will be sufficient to overcome the tension of the spring 147, and the arcuate member 149 will be moved to the left, as shown in Figs. 1 and 16, through the slot 150 when the end of such arcuate member 149 engaging the arm 153 will rotate the latch member 152 about its pivot point, moving the bevelled latch portion 154 from engagement with the end of the lever 157, releasing the same when the lever 80 is moved to a position to throw the clutch elements 77 and 86 out of engagement with each other by the coil spring 159 one end of which is attached to the lower end of the operating lever 80 and the other end attached to a point 160 on the floor of the room or building in which the apparatus is located, thus stopping the intermittent movement of the feed chains 46.

Secured to the cross head 28 at a point adjacent the former 40 is a shaft 161 the ends of which extend through elongated slots 162 in the hollow frame member 11. Secured to each end of the shaft 161 is an arm 163, and to the free end of this arm 163 is secured one end of a coil spring 164, the other end of this coil spring being secured to a pin 165 that extends outwardly from a catch lever 166, this lever 166 having an upwardly extending lug 167 intermediate its ends and by means of which the catch lever 166 is pivotally connected to the end of the shaft 161 adjacent the arm 163. At the end of the hook lever 166 adjacent the end of the feed chains 46 that pass over the sprockets 44 is a hook or catch 168 the purpose of which will be hereinafter described. Pivotally mounted adjacent the end of the catch lever 166 remote from the catch 168 is a link 169 having connected at a point intermediate its ends one end of a coil spring 170, the other end of this spring being attached to an upwardly projecting member 171 formed integral with, and at the extreme end, of the lever 166. At the upper end of the link 169, and projecting inwardly therefrom toward the hollow frame member 11, is a pin 172 which pin is adapted to be engaged by the depending faces or edges of a member 173 provided with a slot 174 through which passes an adjusting bolt 175 that screws into the top of the cover plate 30 and by means of which the member 173 may be adjusted along the line of movement of the pin 172 as the same is reciprocated by the shaft 161 on the cross head 28.

Referring now particularly to Figs. 8 and 9, Fig. 8 shows the position of the hook 168 with respect to the feed chain 46 at the extreme inward movement of the cross head 28 and, therefore, the shaft 161, moves from the position indicated in Fig. 8 to the position indicated in Fig. 9. In this movement the pin 172 engaging with the face or edge of the member 173, moves the end of the catch lever 166, on which is integrally formed the element 171, downwardly rotating the catch lever 166 about its pivotal connection on the shaft 161, thus raising the hook 168 upwardly and away from the feed chain 46. After the pin 172 has passed beyond the lower end of the member 173, the spring 164 moves the pin 172, and therefore that end of the hook lever 168 on which the same is mounted, upwardly into the position shown in Fig. 9, dropping the hook 168 slightly below the upper surface of the feed chain 46, as shown in such Fig. 9, with the hook 168 in position to engage with the lacing 97 on the return movement of the cross head 28, and pull the lacing from between the members 126 and 123. Pivotally mounted to the side of the top cover plate 30 by screw 176 is a link 177, this link being spaced from the top cover plate 30 by a sleeve 178. This link 177 is provided with an elongated slot 179 which engages with the projecting reduced end of the shaft 161, and pivotally mounted at the lower end of such slot 169 by bolt 180 and nut 181 is a lever 182, this lever being pivotally mounted on the bolt 180 at a point intermediate its ends. The end of the lever 180 adjacent the sprocket 44 is enlarged and rounded, as shown at 183, while the other end is provided with an elongated slot 184 which engages with an outwardly extending pin 185 secured to the end of the lever 166 and adjacent the element 171 thereon. This lever 182 operates in conjunction with the hook lever 166 and, referring again to Figs. 8 and 9, it will be noted that such lever 182 moves from the position shown in Fig. 8 forwardly and then downwardly in an arcuate path into the position shown in Fig. 9, in this movement engaging with the lacing 97, after it has been moved from between the members 126 and 123 by the hook 168, and forcing such lacing downward and out of engagement with any element of the feed chains 46 and allowing the ends of such lacing to drop in such manner that the lacing will be positioned in the round portion of the bars 135, from whence such lacings are periodically removed by an attendant.

Situated between the feed chains 46 and near the sprockets 44, but between the sprockets 44 and 43, and integral with the hollow member 11 is a cross bar 186 on which is located a combined cutter and forming block 187 that is adapted to cooperate with the block 40 carried by the cross head 28, bolts 188 being utilized to effect relative adjustment between such block 187 and the block 40. The block 187 is substantially rectangular in cross section, as shown in Figs. 12 and 13, and is provided midway of its length, as shown in Figs. 12 and 13, with a cut-in portion 189, the length of this portion being the width of lacing that is cut off in the operation of separating such lacing into predetermined lengths. The upper corner of this block 187 throughout its entire width and adjacent to, and associated with, the block 40, is cut away to form a substantially semi-circular groove 190. This groove 190 cooperates with a substantially semi-circular groove 191 in the block 40, as shown in Fig. 14, these two grooves 190 and 191 being the means employed to give to the ends of predetermined lengths of lacing a rounded shape and to simultaneously compress and harden the molded or moldable material with which such ends are saturated, and by cutting from the lacing that is of indefinite length a portion of a width equal to the element 189, as shown in Fig. 14, the grooves 190 and 191 acting to not only compress and harden the molded or moldable material on the lacing ends, but also causing a flow of such molded or moldable material over the severed ends of predetermined lengths, closing the ends and encasing them in a shell of film of molded or moldable material.

While the pulley 17 has been described as a tight pulley to distinguish the same from the pulley 18, which is a loose pulley, it is not tight in the sense that it is keyed to the main drive shaft 15, but only because it is utilized to drive such shaft 15. Referring now to Fig. 15, it will be noted that the hub of the pulley is provided with a projecting pin 193 that, as it rotates, engages with a pin 194 that projects outwardly from a collar 195 that is keyed to the main drive shaft 15. This pin 194 is slidable in the collar 195 in the direction of its length and is forced into its outermost position to be engaged by the pin 193 by a spring 196, a non-circular head 197 on such pin 194 limiting its outward movement. Pivotally mounted at its lower end to the hollow frame member 11 is an arm 198, the upper end of this arm lying in a groove 199 in the collar 195, such end being pointed, as shown at 200, to engage with the non-circular member 197 to compress the same and move the end of the pin 194 out of the path of movement of the pin 193 on the hub of the tight pulley 17. A coil spring 201 secured one end to the arm 198 and the other end to a rod 202 that is secured to the hollow frame member 11, tends to maintain the upper rounded portion of such arm 198 in engagement with the bottom of the groove 199. Secured to the arm 198 at a point intermediate its ends is one end of a link 203 that has provided at its other end a stub shaft 204 on which is rotatably mounted a cam roller 205 adapted to engage with a cam path 206 formed on the inside of the flange of the tight pulley 17. As the pulley 17 rotates in the direction of the arrow shown, for example, in Fig. 6, the pointed end 200 of the arm 198 lying in the groove 199 of the collar 195 will engage with the non-circular head 197 of the pin 194 withdrawing such pin from engagement with the pin 193 of the pulley 17 and stopping thereby the rotative movement of the main drive shaft 15 and, therefore, the reciprocating movement of the cross head and parts carried thereby while allowing the pulley 17 to rotate under the influence of its driving belt. As the pulley 17 rotates, the cam surface 206 on the interior of the arm thereof engages with the roller 205 on the link 203, causing a rotative movement to the left, as viewed in Fig. 6, of the arm 198, causing the end 200 of such arm to release the pin 194 which, under the influence of the spring 196, returns to its initial position, as shown in Fig. 15, in position therefore, to be engaged by the pin 193 on the hub of the driving pulley 17. This stopping of the cross head 28 and parts carried thereby is so timed with the cooperative action of the blocks 40 and 187 that such blocks are brought together into the compressive position shown in Fig. 13 and held there for a predetermined length of time to allow the full force of the compressive action to be exerted on the molded or moldable material on the lacing ends and such material solidified.

The operation of my improved apparatus is as follows, it being assumed that the lacing comes in reels and is of indeterminate length and that it is desired to cut the same into short predetermined lengths and to tip each length of each predetermined length or the end of the lacing passed through the eye 146 of the arm 145, under the rollers 142 on the U shaped member 141, through eyes 144 on the top of the member 139, through the short length of tube 96 at the end of the arm 95 and such end is then tied to any convenient portion of the machine as, for example, to the arm 132 adjacent to the block 134. Power is thrown onto the machine by moving the driving belt (not shown) from the loose pulley 18 onto the tight driving pulley 17 and the lever 157 is moved into position to be engaged by the bearing member 151 on the member 152, as shown in Fig. 18, to cause engagement of the clutch elements 77 and 86 and the connection therefore of the shaft 75 to the driving mechanism. It is assumed, also, that, previous to the operations above described, current is turned on to heat the electrical heating units 34 and 69 and that the tank or basin 100 has been filled to the proper depth with liquid or semi-liquid material and with which it is desired to tip the ends of the lengths of lacing 97. The reciprocating motion of the cross head 28 will, through the curved connecting arm 59, give to the feed chains 46 a step by step movement in the direction of the arrows shown and, as such feed chains pass upward over the sprocket 43, the element 126 is separated from the link 124, forming a substantially V shaped passage in which the lacing 97 is led by the rotation of the shaft 75, the lacing in this movement passing over the curved ends of the curved bearing rod 130 downwardly under the hook-like end of the bar 132 and upward again on the next revolution of the shaft 75, depositing the next loop of lacing into the succeeding V shaped groove formed by the separation of the next succeeding element 126 from its associated link 124. As the shaft rotates, the cam 104 thereof engages with the pin 103 on the lower end of the lever 102, rocking such lever and causing an upward and downward motion of the arm 109 about its pivotal point 108, the end 110 of such arm carrying up at each upward movement sufficient of the liquid from the tank 100 to thoroughly saturate a required length of the lacing 97 that lies between the feed chains 46. As such arm 109 moves upward and deposits the liquid on the lacing, as above described, the cam 118 on the shaft 75 engages with the curved lower end of the shaft 116, rocking such shaft and causing the arm 119 secured to the top thereof to engage with the pivoted arm 111 and move the same into engagement with the curved end 110, squeezing the saturated portion of the lacing therebetween and removing therefrom the surplus liquid material. As the feed chains move forward step by step toward the block 187, the first loop of the lacing laid onto such feed chains is engaged by the hook 168, in the manner above described, which pulls the lacing over and into position in engagement with the groove 190 in such block 187. The cross head 28, in its reciprocating movement toward the block 187, carries the block 40 into the position shown in Fig. 12, severing a predetermined length of lacing from the lacing 97 of indeterminate length and cutting out therefrom a section of lacing equal in length to the width of the slot 189, as shown in Fig. 14. Further movement of the block 40 toward the block 187 brings the grooves 190 and 191 into cooperative position, as shown in Fig. 13, to compress and round the ends of the lacing lengths, whether such lacing be round or oblong or any other shape in cross section, compressing the liquid molded or moldable material into cylindrical-like shape and causing the flow of any excess of material over the ends in such manner as to seal such ends with the material. At this point in the operation of the apparatus, the point 200 on the arm 198 engages with the non-cylindrical head 197 of the pin 194, withdrawing such pin from engagement with the pin 193 in the driving pulley 17 and stopping movement of the cross head 28 and all parts associated with said cross head, holding the grooves 190 and 191 in cooperative relation to each other until the pulley 17 has made practically a complete revolution when the pins 192 and 193 again come into engagement and the rotative movement of the main drive shaft again takes place. After the block 40, carried by the cross head 28, has been moved away from the block 187, the enlarged end 183 of the lever 182 operates, as above described and as illustrated in Figs. 8 and 9, to pull the ends of the predetermined lengths of lacing from engagement with the members 126 and 123 whereupon such predetermined lengths drop outward to be caught and engaged by the rounded portion of the rods 135. Assuming that the machine is operating properly, the above sequence of operations is carried out indefinitely or as long as any of the lacing of indeterminate length remains. If, however, as sometimes happens, a knot appears in the lacing 97, or a ravel portion is encountered, too large to pass through the eye 146 of the arm 145, the tension exerted on the lacing 97 by the rotating arm 95 on the shaft 75 pulls the arm 145 against the tension of its spring 147, moving the arcuate member 149 through the slot 150 in the standard 138 and the end of such arcuate member 149 engages with the arm 153 of the member 152, rotating such member 152 and moving the catch 154 thereon from engagement with the lever 157 whereupon the spring 159 acts to move the safety clutch operating lever 80 about its pivotal point 81 and separating the clutch elements 77 and 86 thereby stopping rotation of the shaft 75 and preventing injury to the machine or the tipping of imperfect lacings.

While I have necessarily shown and described the preferred embodiment of my improved apparatus somewhat in detail, it is to be understood that I may vary the size, shape, and arrangement of parts of such apparatus within wide limits without departing from the spirit of the invention.

My present machine is adapted to carry out my novel method of lace tipping, this method being broadly claimed in my copending application, Ser. No. 474253, filed June 1, 1921.

Having thus described my invention, what I claim as new is:

1. In a machine of the class described, the combination of means for looping an indeterminate length of lacing into loops of predetermined length, means for grasping each loop at a plurality of points, means for impregnating a section of each loop with a solution of molded or moldable material, and means for shaping and setting the impregnated portions of the loops.

2. In a machine of the class described, the combination of means for looping an indeterminate length of lacing into loops of predetermined length, means for grasping each loop at a plurality of points spaced apart from each other and feeding the loops forward step by step, means for impregnating a portion of each loop between the holding means with a solution of molded or moldable material, heating elements spaced apart from each other and between which the impregnated portions of the loops are fed, and means for compressing and setting the impregnated portions of the loops after they have passed between the heating elements.

3. In a machine of the class described, the combination of means for looping a lacing of indeterminate length into loops of predetermined length, means for grasping each loop at a plurality of points spaced apart from each other and feeding the loops forward step by step through the machine, means for impregnating a portion of each loop with a solution of molded or moldable material, heating elements spaced apart from each other and between which the impregnated portion is fed, a molding block associated with the feeding and holding means, means for placing each loop in its forward feeding movement into position on the block, means for severing each loop at a point intermediate the ends of the impregnated portion, and means for shaping and setting such impregnated portions.

4. In a machine of the class described, the combination of means for looping a lacing of indeterminate length into loops of predetermined length, means for grasping each loop at a plurality of points spaced apart from each other and feeding the loops forward step by step through the machine, means for impregnating a portion of each loop with a solution of molded or moldable material, means for removing surplus molded or moldable material therefrom, heating elements spaced apart from each other and between which the impregnated portion is fed, a molding block associated with the feeding and holding means, means for placing each loop in its forward feeding movement in position on the block, means for severing each loop at a point intermediate the ends of the impregnated portion, and means for shaping and setting such impregnated portions.

5. In a machine of the class described, the combination of means for looping a lacing of indeterminate length into loops of predetermined length, means for grasping each loop at a plurality of points spaced apart from each other and feeding the loops forward step by step through the machine, means for impregnating a portion of each loop with a solution of molded or moldable material, heating elements spaced apart from each other and between which the impregnated portion is fed, a molding block associated with the feeding and holding means, means for placing each loop in its forward feeding movement in position on the block, means for severing each loop at a point intermediate the ends of the impregnated portion, means for shaping and setting the impregnated portions of the loop, and means for removing the ends of the loop from the feeding means.

6. In a machine of the class described, the combination of a base, a drive shaft rotatably mounted therein, a cross head connected to said drive shaft and having a reciprocating movement in the base, a rotatably mounted shaft in said base, means for connecting said shaft at will to the drive shaft, an arm attached to said shaft, means on said arm through which a lacing of indeterminate length passes, a pair of feeding chains mounted in said base, means operable by the cross head for imparting an intermittent feeding movement to the feeding chains, a plurality of holding means on the chains, the intermittent step by step of the feeding chains being operable in synchronism with the rotation of the shaft carrying the arm whereby the loops of lacing are each fed into, and grasped by, the holding devices on the feeding chains, a reservoir for holding a solution of molded or moldable material located beneath one end of the feeding chains, means associated with said reservoir and operable by the last said shaft for feeding a predetermined amount of solution onto the portion of the lacing held by the feeding chains, and means also operable by the last said shaft for removing surplus solution from the lacing.

7. In a machine of the class described, the combination of a reservoir for holding a solution of molded or moldable material, a pair of feed chains spaced apart from each other and at each side of the reservoir, means on said chains for holding and feeding a length of lacing over the top of said reservoir; means for feeding a predetermined amount of solution upward from said reservoir and onto a portion of the lacing extending between the feed chains, and means cooperating with said solution feeding means for removing surplus solution from the lacing.

8. In a machine of the class described, the combination of a reservoir for holding a solution of molded or moldable material, a pair of feed chains spaced apart from each other and located at each side of the reservoir, means for moving said feed chains in unison and with a step by step movement, a plurality of holding means on each chain for holding a length of lacing and feeding same upward step by step across the top of the reservoir, means for placing a length of lacing in position on the chain at each step by step movement thereof, means for feeding a solution onto each length of lacing from the reservoir, means cooperating with such last means for removing surplus molded or moldable material from the lacings, and means for operating these latter two means operating in synchronism with the step by step movement of the feeding chains.

9. In a machine of the class described, the combination of a base, a drive shaft mounted therein, a cross head mounted in said base, connections between the cross head and drive shaft for imparting a reciprocating movement to the cross head, a second shaft rotatably mounted in said base, driving connections between the main driving shaft and said second shaft, a clutch controlling the connection of said second shaft to the drive shaft, a looping arm attached to said second shaft for looping a lacing of indeterminate length into loops of predetermined circumference, a standard, a lever pivotally mounted thereon, connections between said lever and said clutch for controlling the operation thereof, a latch on said standard and engaging with the lever to hold the clutch in operative position, an arm pivotally mounted on said standard and provided with an eye through which the lacing passes before engaging with the looping arm, and means attached to said pivoted arm and engaging the latch on the standard whereby, if the lacing becomes tangled or knotted, said pivoted arm is rotated to release the operating lever from the latch and the clutch moved to inoperative position and stop rotative movement of the looping arm and injury to the machine is prevented.

10. In a machine of the class described, the combination of a holding bar, means for looping a lacing of indeterminate length into loops of predetermined length, means for feeding said loops forward into position in said holding bar, means for severing the loops into single strands, means for tipping the ends of each strand with molded or moldable material, and means for guiding the ends of each length of lacing to guide the lengths of lacing into position to be held by the holding bar.

11. In a machine of the class described, the combination of a fixed cutting and forming block, a reciprocating cutting and forming block cooperating therewith to sever a length of lacing held by the fixed block and to compress and set molded or moldable material about the severed ends of the lacing, and means for holding said blocks, in close association with each other for a predetermined length of time.

12. In a machine of the class described, the combination of a fixed cutting and forming block, a forming block having the reciprocating movement toward and from said first block, a driving means for moving said movable block into engagement with the first said block and holding said blocks in operative connection with each other for a predetermined length of time.

13. In a machine of the class described, the combination of a fixed cutting and forming block, a reciprocating member, a forming block carried by said member and reciprocable toward and from the fixed cutting and forming block, means associated with said fixed cutting and forming block for feeding lengths of lacing into and out of position with respect thereto, means operable by the reciprocating member for imparting an intermittent movement to said feeding means, and driving means for said reciprocating means for maintaining the forming blocks in operative relation to each other for a predetermined length of time.

14. In a machine of the class described, the combination of means for supplying lacing continuously, means for predetermining the length of lacing fed to the machine, and means for engaging said lacing and holding it under tension while feeding such lacing through the machine.

15. In a machine of the class described, the combination of means for supplying lacing continuously measuring means for predetermining the length of lacing to be fed to the machine, means for grasping said lacing under tension at a plurality of points spaced apart from each other and simultaneously feeding such lacing through the machine, and means for tipping, molding, and cutting said lacing while so held by the grasping means.

16. In a machine of the class described, the combination of means for supplying lacing continuously, adjustable measuring means for predetermining the length of lacing fed to the machine at each stroke, means for engaging said lacing at a plurality of points spaced apart from each other and feeding the lacing through the machine simultaneously, and means cooperating with the feeding for tipping, molding, and cutting said lacing into lengths during the feeding-through movement.

In testimony whereof, I have signed my name to this specification.

CARL A. MATSON.